United States Patent [19]

Matthes et al.

[11] 4,346,423
[45] Aug. 24, 1982

[54] SHORT CIRCUIT DISCONNECTING CIRCUIT

[75] Inventors: Hans Matthes, Wermelskirchen; Klaus Reifenrath, Solingen, both of Fed. Rep. of Germany

[73] Assignee: AEG-Elotherm, G.m.b.H., Remscheid-Hasten, Fed. Rep. of Germany

[21] Appl. No.: 293,962

[22] Filed: Aug. 18, 1981

[30] Foreign Application Priority Data

Aug. 30, 1980 [DE] Fed. Rep. of Germany ....... 3032757

[51] Int. Cl.³ .............................................. B23K 9/10
[52] U.S. Cl. .................................... 361/87; 219/69 S; 328/132; 361/93
[58] Field of Search ............................ 361/86, 87, 93; 219/69 S, 130.21, 130.32; 328/132

[56] References Cited

U.S. PATENT DOCUMENTS

| 3,763,399 | 10/1973 | Jenkins | 361/86 X |
| 3,851,134 | 11/1974 | Takarada | 219/69 S |
| 4,303,957 | 12/1981 | Bell, Jr. et al. | 361/86 X |

FOREIGN PATENT DOCUMENTS

| 51-75652 | 12/1974 | Japan | 219/130.21 |
| 50-26502 | 9/1975 | Japan | 219/130.21 |

Primary Examiner—Harry E. Moose, Jr.
Attorney, Agent, or Firm—Cushman, Darby & Cushman

[57] ABSTRACT

A circuit and process for disconnecting the current from the operating gap of an electrolytic processing device in the event of a short circuit in which a signal is produced from the AC current in the transformer supplying power to the gap, such signal indicating the gap current, the maximum value of that signal is stored for successive time periods and the stored value for a preceding period compared with the present signal to operate a switch in the current supply to the gap when a short circuit condition is detected.

6 Claims, 1 Drawing Figure

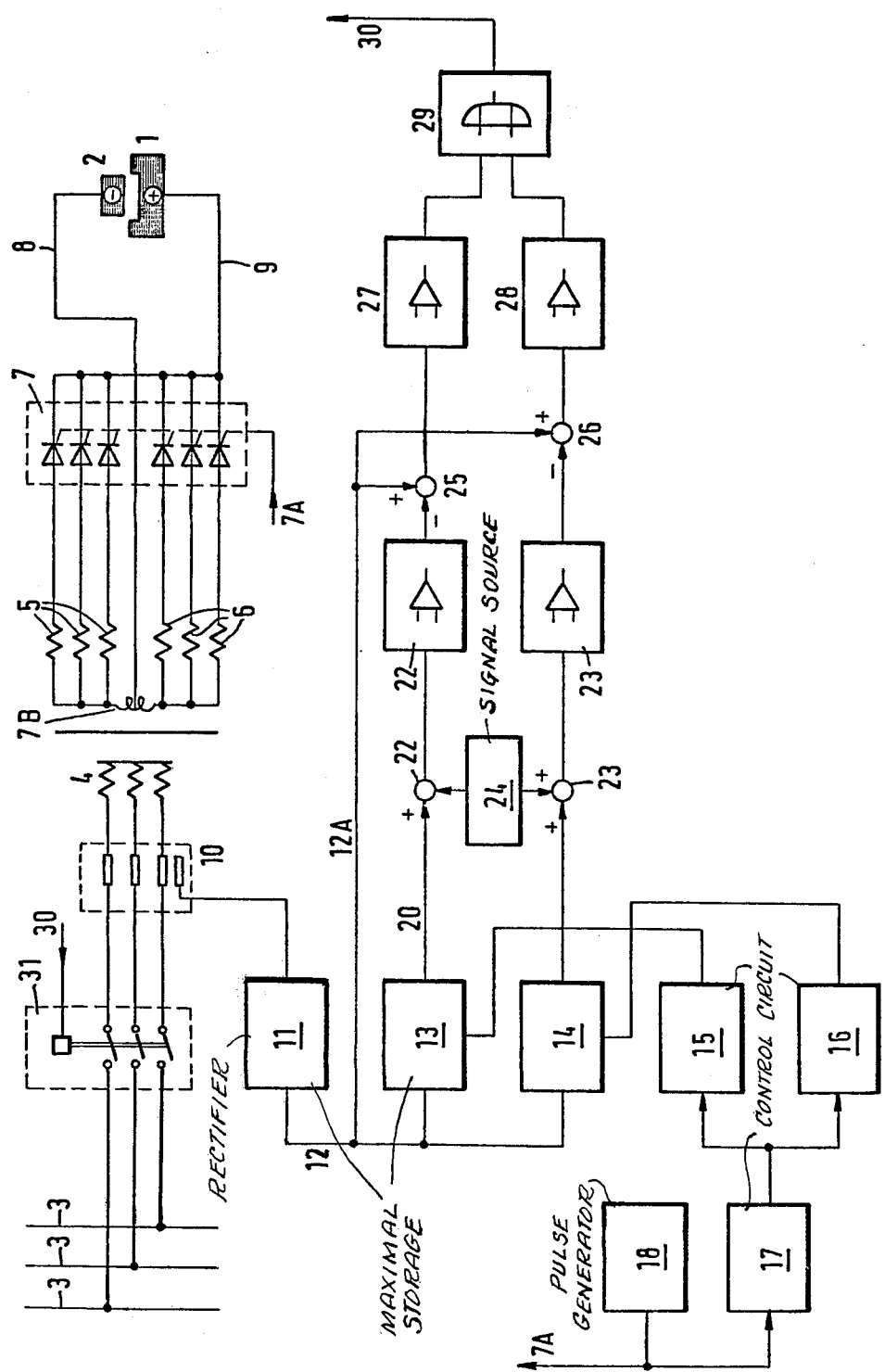

SHORT CIRCUIT DISCONNECTING CIRCUIT

The invention relates to an electrolytic processing device with a short circuit switch for disconnecting the operating current from the operating gap in the event of a short circuit.

It has been known to disconnect the operating current in electrolytic devices during shaping of metallic workpieces in the operating gap of the machine, that is, from the gap filled with the electrolyte and enveloped by the operating electrode and the workpiece, whenever a short circuit occurs between the operating electrode and the workpiece. The short circuit may occur as a result of contact, or as a result of the formation of an electric arc.

In order to prevent damage to the processing electrode and the workpiece in the case of a short circuit by excess current, it has been known to disconnect the operating current from the operating gap by turning off the feeding AC current or to deflect it from the operating gap by way of a short circuit switch connectable in parallel to the operating gap, or else to compensate it with simultaneous disconnecting of the operating DC current by means of countercurrent flowing across the operating gap.

In order to determine the short circuit, short circuit detectors have been known which are connected to the gap and respond to the decrease of the operating DC voltage in the case of a short circuit or to corresponding excess currents. In each case, the detectors have adjusting means which permit adjustment by hand of the upper limit of the operating DC current or else the lower limit of the assigned operating DC voltage, the excess or reduction triggering a corresponding short circuit signal. Since the processing apparatus is fed with more or less smoothed pulsating DC currents, the response limit of the short circuit switch must be adjusted relatively far from the actual true value of the operating DC current and must also be changed with the change of the operating current.

It has furthermore been known to connect a voltage detector to the operating gap. The detector compares the gap voltage with a voltage which corresponds to a fraction of the gap voltage and which is stored by way of a condensor. Upon decrease of the gap voltage a short circuit voltage is triggered. Such arrangements have the disadvantage that in the case of most machines which have a regulating arrangement for the continuous regulation of the operating voltage, switching off in the case of a short circuit occurs only belatedly when the gap voltage regulation becomes ineffective.

The present invention improves the short circuit turn off in such machines so that a quick short circuit switching off is even possible when the voltage at the operating gap of the machine is regulated by separate regulating means to a constant and possible adjustable value. The switching off of the short circuit in that case is independent of the voltage at the operating gap.

The invention furthermore has the purpose of producing an improvement of the sensitivity of disconnection of a short circuit. Another goal of the invention is the elimination of the necessity of a new manual adjustment of the triggering threshold of the short circuit disconnection in the case of a changed operating DC current.

According to the present invention, a signal indicating the operating DC current is fed to a circuit which stores the maximum valve in successive time periods. This maximum value is increased by an adjustable amount, and the resulting signal is compared with the signal indicating the operating current. The comparator signal operates the short circuit switch when a short circuit is detected.

The maximum value storage, summation, comparison and switching are provided in duplicate and are operable alternately, so that two starting signals operate the short circuit switch via an OR circuit. Thus, a quicker response of pertinent operating conditions is achieved.

The attached drawing shows an embodiment by way of example on the basis of a schematic presentation.

The electrolytic processing device contains a workpiece 1 and a processing electrode 2 adjustable in the customary manner in relation to the workpiece. An operating gap filled with a liquid electrolyte is provided between workpiece 1 and electrode 2. The processing device is connected to a DC current source consisting of a high current transformer connected to 3-phase current network 3 with three primary windings 4 and six secondary windings 5 and 6 as well as a multipulse controllable rectifier 7.

The three primary windings 4 are star-connected. The three secondary windings 5 and the seconding windings 6 are likewise star-connected, whereby by the star points of the two star circuits are interconnected by way of a throttle 7B provided with a middle tap. The middle tap is connected by way of a line 8 with electrode 2 and the rectifiers of the rectifier device 7 are connected to workpiece 1 by line 9.

By adjusting the ignition times of the thyristor current switches contained in the rectifier 7 by control line 7A, the direct voltage in the operating gap between workpiece 1 and electrode 2 is regulated to an adjustable constant value. For this purpose, the voltage is measured and is conventionally fed to a regulator (not shown) as a true value signal, and the regulator applies an appropriate signal on line 9.

The processing thus will be undertaken at a constant operating DC voltage. The operating DC current flowing via the operating gap changes at the same time in dependence on the shape of the workpiece to be processed, the shape of the processing electrode, the distance between both workpieces and other operating parameters.

The DC current flowing by way of the operating gap between workpiece 1 and electrode 2 which may amount, for example, to 22,000 amp, is measured by means of current transformers switched into the strands of the primary windings 4. The current transformers of the current transforming device 10 feed a rectifier 11 which at its output produces a DC voltage, which is proportional essentially to the operating DC current across the operating gap. This voltage is available on the measuring line 12.

Conventional storage circuits 13 and 14 are connected to measuring line 12 to produce a signal indicating the maximum amplitude of the intput signal. Circuits 13 and 14 are alternately made operable in a predetermined rhythm by control circuits 15 and 16, so that always one of the two circuits 13 and 14 produces an output signal indicating the maximum value since the circuit was switched on. Thus one circuit is following the signal on line 12 while the other storage circuit stores the maximum value during the last preceding period. Circuits 15 and 16 are controllable by another common control circuit 17 responding to pulses from generator 18, which also operates rectifier 7 via line 7A.

The output signals of the storage circuits 13 and 14 are applied to adders 22 and 23 by lines 20 and 21. Adders 20 and 21 add signal parts adjustable from a signal source 24 to the signals of the lines 20 and 21. The maximum value signals suitably increased thus are compared in comparators 25 and 26 with the signal of line 12, which is led to the comparator by line 12A.

Whenever the signal on line 12A exceeds the applied comparator signals, then switching circuit 27 or 28 applies a signal to OR gate 29, line 30 and a short circuit switch 31 inserted into the feed lines to the primary winding 4, which switch interrupts the current feed to rectifier 7.

The short circuit switch 31 may replace and/or by replaced by a short circuit switch connected in parallel to the operating gap or by other switching arrangement which can limit or prevent the flow of current by way of the operating gap in the case of a short circuit.

Many changes and modifications in the above embodiments can, of course, be carried out without departing from the scope of the invention, that scope intended to be limited only by the scope of the appended claims.

What is claimed is:

1. A circuit for disconnecting the current from the operating gap of an electrolytic processing device in the event of a short circuit comprising:
   means for producing a signal indicating the current in said gap;
   means connected to said producing means for storing the maximum value of said signal within successive time periods;
   means connected to said storing means for comparing the stored value in the preceding period with said signal indicating gap current and producing a switching signal when the comparison indicates a short circuit has occurred; and
   switch means connected to said comparing means for disconnecting the current from said gap when said switching signal is produced.

2. A circuit as in claim 1, wherein said storing means includes first and second storage circuits connected to said signal producing means and control means for alternately operating said storage circuits so that one storage circuit follows said signal indicating the current in said gap and the other storage circuit stores the maximum value in the preceding time period.

3. A circuit as in claim 1 or 2, wherein said comparing means includes means for adding a given value to the stored value.

4. A circuit as in claim 1 or 2, wherein said producing means includes means for detecting the operating DC current on the primary side of a transformer by detecting an AC current and means for rectifying said AC current to produce said signal indicating the current in said gap.

5. A method for disconnecting the current from the operating gap of an electrolytic processing device in the event of a short circuit comprising:
   producing a signal indicating the current in said gap;
   storing the maximum value of said signal within successive time periods;
   comparing the stored value in the preceding period with said signal indicating gap current and producing a switching signal when the comparison indicates a short circuit has occurred; and
   disconnecting the current from said gap when said switching signal is produced.

6. An electrolytic processing device comprising:
   means for producing a processing gap between an electrode and workpiece;
   means for supplying a working current to said gap;
   means for producing a signal indicating the current in said gap;
   means connected to said producing means for storing the maximum value of said signal within successive time periods;
   means connected to said storing means for comparing the stored value in the preceding period with said signal indicating gap current and producing a switching signal when the comparison indicates a short circuit has occurred; and
   switch means connected to said comparing means and said supplying means for disconnecting the current from said gap when said switching signal is produced.

* * * * *